US009654915B2

(12) United States Patent
Guy et al.

(10) Patent No.: US 9,654,915 B2
(45) Date of Patent: May 16, 2017

(54) SYSTEMS AND METHODS FOR ADJUSTING WIRELESS SCAN RATES

(71) Applicants: Wey-Yi W. Guy, Beaverton, OR (US); Chia-Hung S. Kuo, Folsom, CA (US)

(72) Inventors: Wey-Yi W. Guy, Beaverton, OR (US); Chia-Hung S. Kuo, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 259 days.

(21) Appl. No.: 14/498,961

(22) Filed: Sep. 26, 2014

(65) Prior Publication Data

US 2016/0094939 A1     Mar. 31, 2016

(51) Int. Cl.
*H04W 4/02*       (2009.01)
*H04W 52/02*    (2009.01)

(52) U.S. Cl.
CPC ......... *H04W 4/02* (2013.01); *H04W 52/0254* (2013.01)

(58) Field of Classification Search
CPC ............................ H04W 4/02; H04W 52/0254
See application file for complete search history.

(56) References Cited

U.S. PATENT DOCUMENTS

| 2008/0161072 A1* | 7/2008 | Lide | H04W 52/0254 455/574 |
|---|---|---|---|
| 2009/0131081 A1* | 5/2009 | Abdel-Kader | H04W 48/16 455/456.6 |
| 2010/0009643 A1* | 1/2010 | Haartsen | H04W 52/0251 455/127.5 |
| 2010/0135195 A1* | 6/2010 | Sakoda | H04W 76/048 370/311 |
| 2010/0233989 A1* | 9/2010 | Constien | G06F 1/3203 455/343.1 |
| 2013/0084856 A1* | 4/2013 | Prasad | H04W 36/0088 455/434 |
| 2015/0055594 A1* | 2/2015 | Nirantar | H04W 76/045 370/329 |

* cited by examiner

*Primary Examiner* — Marcos Torres
(74) *Attorney, Agent, or Firm* — Eversheds-Sutherland (US) LLP

(57) ABSTRACT

The present disclosure relates to computer-implemented systems and methods for transmitting and receiving audio and video data. A method may include determining, by a device including one or more processors and a plurality of antennas, that the device is in an active state. The method may also include determining, via the plurality of antennas in response to a location request, location information associated with the device. Furthermore, the method may include receiving, from at least one sensor component included in the device, sensor information associated with the device. Additionally, the method may include determining, based at least in part on the location information and the sensor information, a scan rate adjustment event. The method may further include adjusting a current scan rate of the first antenna to a second scan rate.

25 Claims, 3 Drawing Sheets

SYSTEMS AND METHODS FOR ADJUSTING WIRELESS SCAN RATES

TECHNICAL FIELD

The present disclosure generally relates to wireless communication, and in particular, to adjusting wireless scan rates.

BACKGROUND

User devices currently perform location determination with respect to a wide range of applications and uses. For instance, mapping, navigation, social networking, shopping, and/or the like may all benefit from, and request the use of, location determination. To this end, a user device may use various types of components and signals to perform location determination, such as Wi-Fi signals, cellular signals, satellite signals, and/or the like. However, use of these signals and their corresponding electronic components may increase power consumption of the user device.

BRIEF DESCRIPTION OF THE DRAWINGS

Reference will now be made to the accompanying figures and diagrams, which are not necessarily drawn to scale, and wherein.

DETAILED DESCRIPTION

Figure 1:
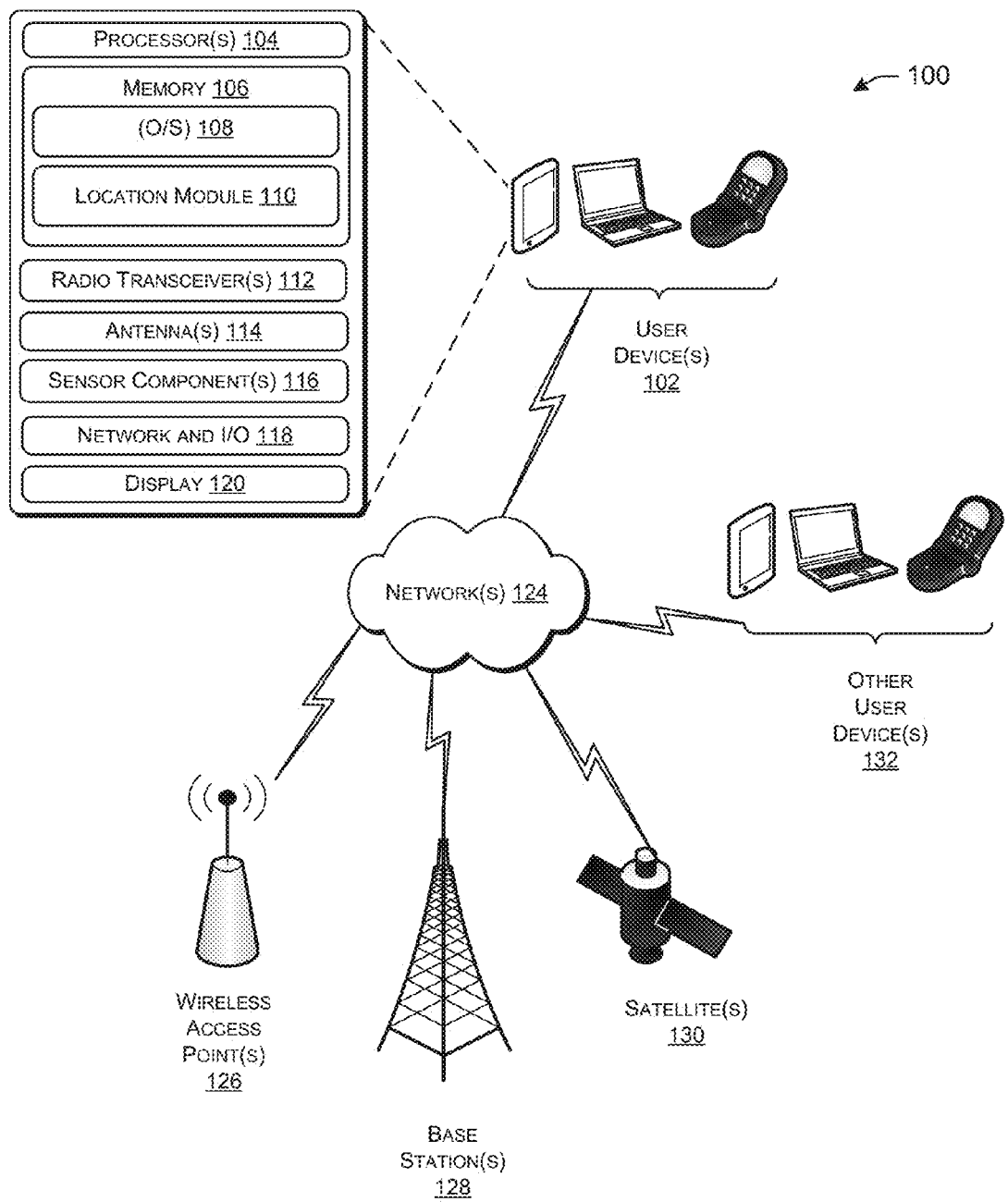
FIG. 1 shows a block diagram of a system for adjusting wireless scan rates, according to one or more example embodiments.

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

As used herein, unless otherwise specified, the term "mobile device" and/or "device" refers, in general, to a wireless communication device, and more particularly to one or more of the following: a portable electronic device, a telephone (e.g., cellular phone, smart phone), a computer (e.g., laptop computer, tablet computer), a portable media player, a personal digital assistant (PDA), or any other electronic device having a networked capability.

As used herein, unless otherwise specified, the term "server" may refer to any computing device having a networked connectivity and configured to provide one or more dedicated services to clients, such as a mobile device. The services may include storage of data or any kind of data processing. One example of the server may include a web server hosting one or more web pages. Some examples of web pages may include social networking web pages. Another example of a server may be a cloud server that hosts web services for one or more computer devices.

As used herein, unless otherwise specified, the term "receiver" may refer to any device or component capable of receiving data, signals, information, etc. For example, a receiver may include an antenna or any other master device.

As used herein, unless otherwise specified, the term "transmitter" may refer to any device or component capable of transmitting data, signals, information, etc. For example, a transmitter may also include an antenna or any other transmission device.

As used herein, unless otherwise specified, the term "transceiver" may refer to any device or component capable of performing the functions of a receiver and/or a transmitter. For example, transceivers may include, but are not limited to, amplifiers, filters, modulation and/or demodulation components, analog-to-digital converters, digital-to-analog converters, and/or the like. Furthermore, the transceivers described herein may be configured to transmit data using various types of transmission protocols, such as Dedicated short-range communication (DSRC) protocols, WiFi radio protocols, Bluetooth radio protocols, Bluetooth Low-Energy protocols, Long-Term Evolution (LTE) protocols, LTE-Advanced protocols, Global System for Mobile Communication (GSM) protocols, Code Division Multiple Access (CDMA) protocols, and/or the like According to certain embodiments, the functionality provided by the receiver and the transmitter may be included in a single transceiver device.

The present disclosure relates to computer-implemented systems and methods for adjusting wireless scan rates. According to one or more embodiments of the disclosure, a device is provided. The device may include a radio transceiver and at least one memory for storing data and computer-executable instructions. Additionally, the device may also include at least one processor to access the at least one memory and to execute the computer-executable instructions. Furthermore, the at least one processor may be configured to execute the instructions to determine that the device is in an active state. Additionally, the at least one processor may be configured to execute the instructions to determine, via the plurality of antennas in response to a location request, location information associated with the device, wherein a first antenna of the plurality of antennas is to operate at a current scan rate equal to a first scan rate. The at least one processor may also be configured to execute the instructions to receive, from the at least one sensor component, sensor information associated with the device. The at least one processor may also be configured to execute the instructions to determine, based at least in part on the location information and the sensor information, a scan rate adjustment event. Furthermore, the at least one processor may also be configured to execute the instructions to adjust, based least in part on the scan rate adjustment event, the current scan rate of the first antenna to a second scan rate different from the first scan rate.

According to one or more embodiments of the disclosure, a method is provided. The method may include determining, by a device including one or more processors and a plurality of antennas, that the device is in an active state. The method may also include determine, via the plurality of antennas in response to a location request, location information associated with the device, wherein a first antenna of the plurality of antennas is to operate at a current scan rate equal to a first scan rate. Additionally, the method may include receiving, from at least one sensor component included in the device, sensor information associated with the device. The method may also include determine, based at least in part on the location information and the sensor information, a scan rate adjustment event. Furthermore, the method may include adjusting, based least in part on the scan rate adjustment event, the current scan rate of the first antenna to a second scan rate, wherein the second scan rate is different from the first scan rate According to one or more embodiments of the disclosure, a non-transitory computer-readable medium is provided. The non-transitory computer-readable medium may have embodied thereon instructions executable by one or more processors. The instructions may cause the one or more processors to determine that a device is in an active state, the device comprising a plurality of antennas and at least one sensor component. Additionally, the computer-readable medium may include instructions to determine, via the plurality of antennas in response to a location request, location information associated with the device, wherein a first antenna of the plurality of antennas is to operate at a current scan rate equal to a first scan rate. Moreover, the computer-readable medium may include instructions to receive, from the at least one sensor component, sensor information associated with the device. The computer-readable medium may also include instructions to determine, based at least in part on the location information and the sensor information, a scan rate adjustment event. Furthermore, the computer-readable medium may also include instructions to adjust, based least in part on the scan rate adjustment event, the current scan rate of the first antenna to a second scan rate, wherein the second scan rate is lower than the first scan rate.

The above principles, as well as perhaps others, are now illustrated with reference to FIG. 1, which depicts a system 100 for adjusting wireless scan rates in accordance one or more example embodiments. The system 100 may include a user device 102 having one or more computer processors 104 and a memory 106, which may store an operating system 108 and a location module 110. The user device 102 may further include a radio transceiver 112, one or more antennas 114, one or more sensor components 116, network and input/output (I/O) interfaces 118, and a display 120 in communication with each other. The system 100 may also include a network 124 to facilitate communication between the user device 102, one or more wireless access points 126 or wireless beacons, one or more base stations 128, one or more satellites, and/or one or more other user devices 132. It will be appreciated that the other user devices 132 may include similar components to user device 102.

The computer processors 104 may comprise one or more cores and may be configured to access and execute (at least in part) computer-readable instructions stored in the memory 106. The one or more computer processors 104 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user devices 102 may also include a chipset (not shown) for controlling communications between the one or more processors 104 and one or more of the other components of the user device 102. In certain embodiments, the user device 102 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106 may comprise one or more computer-readable storage media (CRSM). In some embodiments, the memory 106 may include non-transitory media such as random access memory (RAM), flash RAM, magnetic media, optical media, solid-state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106 may store an operating system that includes a plurality of computer-executable instructions that may be implemented by the computer processor 104 to perform a variety of tasks to operate the interface(s) and any other hardware installed on the user device 102. The memory 106 may also store content that may be displayed by the user device 102 or transferred to other devices (e.g., headphones) to be displayed or played by the other devices. The memory 106 may also store content received from the other devices. The content from the other devices may be displayed, played, or used by the user device 102 to perform any necessary tasks or operations that may be implemented by the computer processor 104 or other components in the user device 102 and/or master device 120.

According to certain embodiments, the memory 106 may also store a location module 110. The location module 110 may be configured to facilitate the determination of location information. Furthermore, as will be described in more detail below, the location module 110 may be configured to adjust the respective scan rates of the one or more antennas 114 based on the location information and sensor information received from the sensor components 116.

The network and I/O interfaces 118 may comprise one or more communication interfaces or network interface devices to provide for the transfer of data between the user device 102 and another device (e.g., network server) via a network (not shown). The communication interfaces may include, but are not limited to: body area networks (BANs), personal area networks (PANs), wired local area networks (LANs), wireless local area networks (WLANs), wireless wide area networks (WWANs), and so forth. The user device 102 may be coupled to the network via a wired connection. However, the wireless system interfaces may include the hardware and software to broadcast and receive messages either using the Wi-Fi standard, the Wi-Fi Direct Standard (see Wi-Fi Direct specification published in October 2010) and/or the IEEE 802.11 wireless standard (see IEEE 802.11-2012, published Mar. 29, 2012;), the Bluetooth standard, the Bluetooth Low-Energy standard, the Wi-Gig standard, and/or any other wireless standard and/or a combination thereof. The wireless system may include a transmitter and a receiver or a transceiver capable of operating in a broad range of operating frequencies governed by the IEEE 802.11 wireless standards. The communication interfaces may utilize acoustic, radio frequency, optical, or other signals to exchange data between the user device 102 and another device such as an access point, a host computer, a server, a router, a reader device, and the like. The network 124 may include, but is not limited to: the Internet, a private network, a virtual private network, a wireless wide area network, a local area network, a metropolitan area network, a telephone network, and so forth.

The display 120 may include, but is not limited to, a liquid crystal display, a light-emitting diode display, or an E-Ink™ display as made by E Ink Corp. of Cambridge, Mass. The display may be used to show content to a user in the form of text, images, or video. In certain instances, the display may also operate as a touch screen display that may enable the user to initiate commands or operations by touching the screen using certain finger or hand gestures.

According to one or more embodiments, the location module 110 may include computer-executable instructions that may cause the processor 104 to perform operations related to adjusting the scan rate of one or more antennas 114 based on location information and/or sensor information. In certain cases, the location module 110 may receive an indication and/or instruction to determine location information associated with the user device 102. For example, an application (not illustrated) being executed on the user device 102 may request location information to perform certain functions. It will be appreciated that various types of applications are contemplated that may request the location information, including, but not limited to, mapping applications, navigation applications, social networking applications, merchant applications, shopping applications, and/or the like.

In order to determine the location information, the location module 110 may be configured provide instructions that cause one or more of the antennas 114 to (e.g., via the radio transceiver(s) 112) to transmit and/or receive signals, such as to and/or from various devices over the network 124 (e.g., the wireless access points 126, base stations 128, satellites 130, other user devices 132, and/or the like). As such, the antennas 114 may include various types of antennas, such as Wi-Fi antennas, cellular antennas (e.g., Global System for Mobile (GSM) antennas, code division multiple access (CDMA) antennas, etc.), satellite antennas (e.g., GPS), Bluetooth antennas, near-field communication (NFC) antennas, and/or the like. Furthermore, in certain implementations, each of the antennas 114 may be associated with respective radio transceivers 112 although it will be appreciated that in other implementations, more than one antenna may be associated with a particular radio transceiver 112. In addition, the location module 110 may use any combination of the antennas 114 in order to perform location determination operations.

According to certain embodiments, the antennas 114 may be associated with respective scan rates. A scan rate for an antenna 114 may refer how often the antenna 114 performs a scan. To this end, a scan may refer to certain operations of the antenna 114 that relate to broadcasting or transmitting signals for location determination purposes. In certain implementations, performing a scan may relate to performing device discovery and/or signal acquisition operations. For instance, performing a scan for a Wi-Fi antenna may include broadcasting or transmitting signals to scan for and/or discover wireless access points 126. Similarly, a Bluetooth antenna scan may include transmitting signals to discover other devices (e.g., beacons or other user devices 132). A satellite antenna scan may include operations related to acquiring a signal from one or more satellites, and a cellular antenna scan may be associated with transmitting signals to or paging a base station 128 (e.g., cell tower). In some implementations, a typical scan rate for one or more of the antennas 114 may be approximately once very thirty seconds, although it will be appreciated that a wide range of scan rates are possible for the antennas 114 and that any magnitude or value of the scan rates are contemplated.

Moreover, antenna 114 scans may be associated with certain levels of power consumption. For instance, a Wi-Fi antenna scan may be associated with approximately 100 mA in power usage, a Bluetooth scan may be associated with approximately 1.5 mA, a satellite scan may be associated with approximately 50 mA in power usage, and a cellular antenna scan may be associated with about 1.2 mA. It will be appreciated that the power usage values described above are merely examples, and that the antennas may be associated with other, different power usage values.

In order to reduce power consumption of the user device 102, the location module 110 may adjust the respective scan rates of one or more of the antennas 114. For example, the location module 110 may be configured to detect and/or determine, based on location information, a scan rate adjustment event. As such, a scan rate adjustment event may indicate that a respective scan rate of one or more of the antennas 114 is to be adjusted (e.g., increased or decreased). For instance, based on the location information, the location module 110 may determine that the user device 110 is located indoors. As a result, the location module 110 may reduce the scan rate of, or even deactivate (e.g., reduce scan rate to 0 scans), a satellite antenna and a cellular antenna of the one or more antennas 114.

The location module 110 may also be configured to receive sensor information from the sensor component(s) 116. Sensor information may include any information associated with an operational status or state of any component of the user device 102. For example, sensor information may indicate a battery level of the user device 102, a power state of the user device 102 (e.g., an active state, full-powered state, idle state, sleep, off state, etc.), whether the display 120 is active or inactive, or any other type of status information associated with the user device 102. Correspondingly, the sensor component 116 may include battery sensors, power state sensors, display sensors, and/or the like. In certain implementations, the sensor information may also facilitate location determination by detecting the movement and/or orientation of the device 102 (e.g., via sensor components 116 such as accelerometers, gyroscopes, magnetometers, and/or the like).

Furthermore, the location module 110 may also be configured to detect a scan rate adjustment event based at least in part on the sensor information received from the sensor components 116. For instance, the location module 110 may determine, based on the sensor information, that a battery level of the user device 102 is less than a battery level threshold (e.g., less than 10%). As a result, the location module 110 may determine that one or more of the antennas 114 is to be deactivate and/or that a respective scan rate of one or more of the antennas 114 is to be reduced. Various types of scan rate adjustment events based on the location information and the sensor information are contemplated and described in more detail with reference to FIG. 3.

Figure 2:
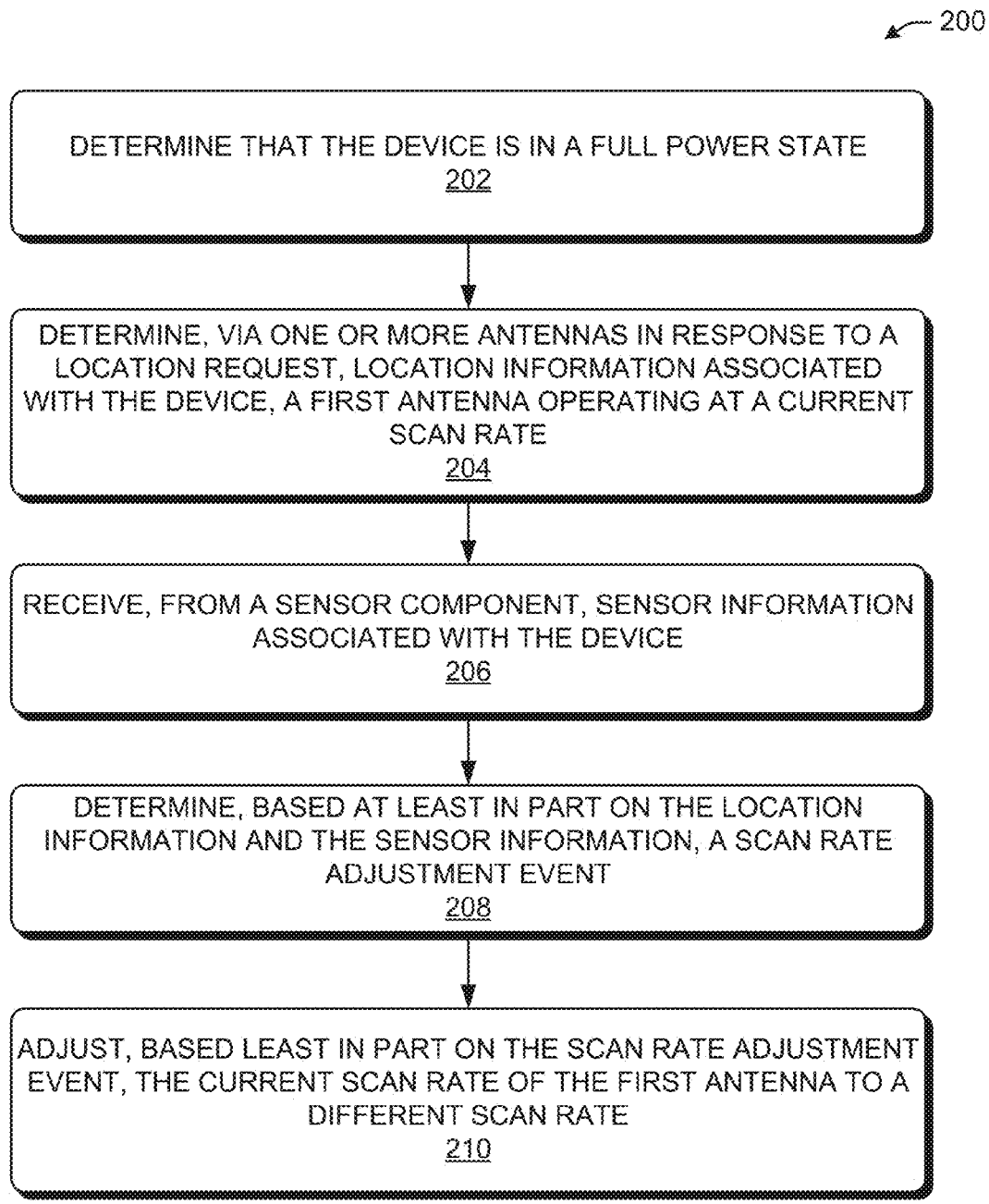
FIG. 2 shows a flow diagram for adjusting wireless scan rates, according to one or more example embodiments.

Referring now to FIG. 2, a flow diagram of a method 200 is illustrated depicting adjusting wireless scan rates in accordance with one or more example embodiments. The method 200 may begin in block 202, where a computer, such as a user device 102, may determine that the device 102 is in an active state. As previously discussed, the user device 102 may include one or more antennas 114. In block 204, the user device 102 may determine, via the one or more of antennas 114 in response to a location request, location information associated with the device. To this end, a first antenna of the one or more antennas 114 may operate at a current scan rate. In block 206, the user device 102 may receive, from a sensor component (e.g., sensor component 116), sensor information associated with the user device 1202. In block 208, the user device 102 may determine, based at least in part on the location information and the sensor information, a scan rate adjustment event. In block 210, the user device 102 may adjust, based at least in part on the scan rate adjustment event, the current scan rate of the first antenna to a different scan rate.

Figure 3:
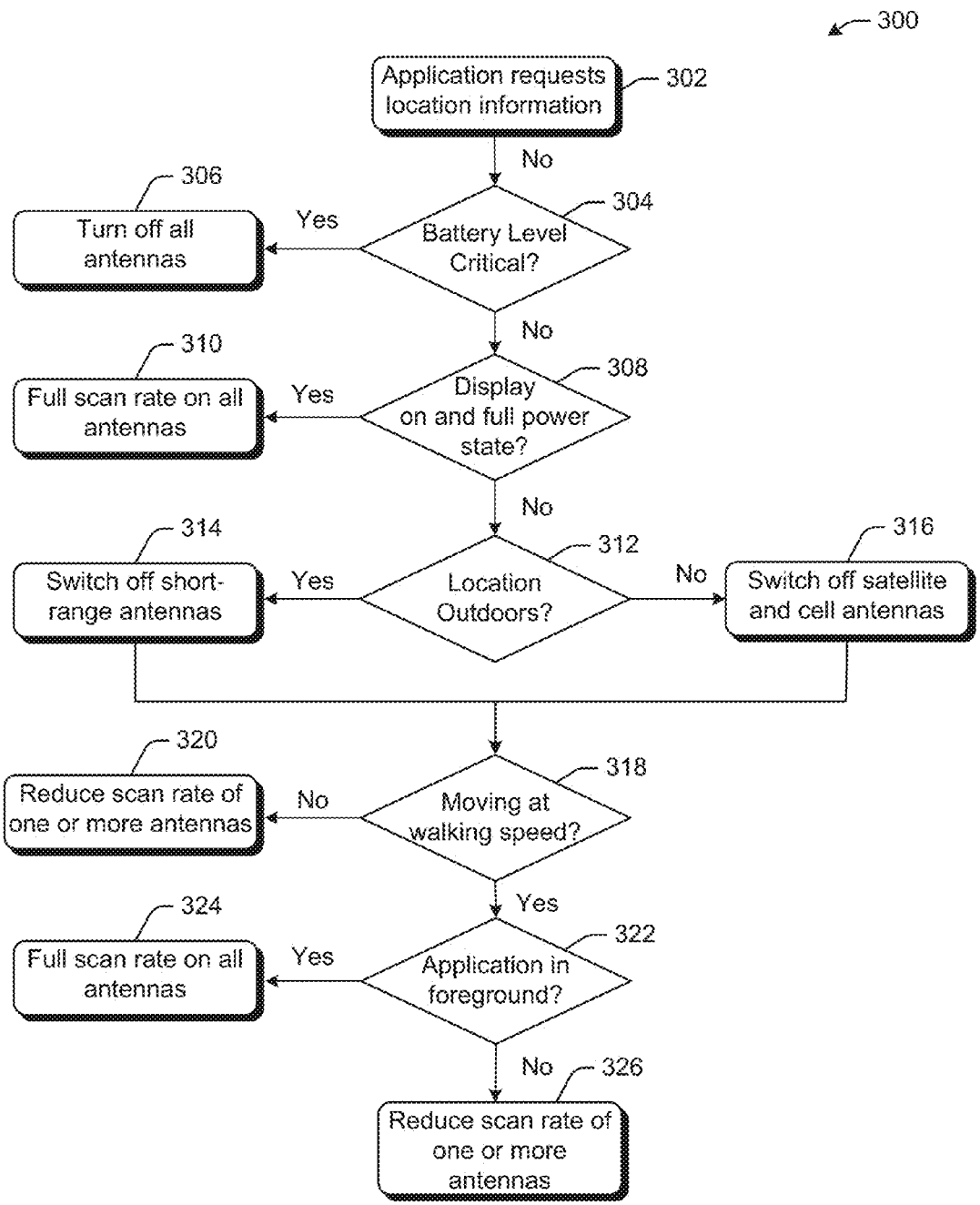
FIG. 3 show a flow diagram for adjusting wireless scan rates, according to one or more example embodiments.

Referring now to FIG. 3, a flow diagram of a method 300 is illustrated for adjusting wireless scan rates in accordance with one or more example embodiments. In certain implementations, the method 300 may represent an example decision flow for adjusting respective scan rates of one or more antennas, such as the one or more antennas 114 in the user device 102. The method 300 may begin in block 302, where an application, such as an application being executed on the user device 102, may request location information. The request may be received by a location module 110 of the user device 102. In diamond 304, the location module 110 may determine, based on sensor information, whether the battery level is critical. For instance, the location module 110 may determine whether the battery level is below a battery level threshold. If the location module 110 determines that the batter level is critical, the method 300 may proceed to block 306, where the location module 110 may switch off one or more of the antennas 114. In certain implementations, the location module 110 may cause all of the antennas 114 to be deactivated.

In diamond 308, if the battery level is not critical, the location module 110 may determine, based on sensor information, whether the display 120 of the user device 102 is activated and whether the user device 102 is in a full-power state. If so, the method 300 may proceed to block 310. In block 310, the location module 110 may facilitate operation of the antennas 114 at respective scan rates equal to their respective maximum scan rates (e.g., full scan rates). In certain implementations, this may include increasing a respective scan rate of a particular antenna operating a scan rate below its maximum scan rate. If not, the method 300 may proceed to diamond 312. In diamond 312, the location module 110 may determine, based on location information, whether the device is location outdoors. If the user device 102 is location outdoors, the method 300 may proceed to block 314. In block 314, the location module 110 may deactivate one or more of the antennas 114, such as antennas that are associated with a short range. For instance, the location module 110 may deactivate a Bluetooth antenna, a Wi-Fi antenna, and/or an NFC antenna. If the user device 102 is not located outdoors (e.g., located indoors), the location module 110 may deactivate one or more antennas 114 that are associated with relatively long ranges. For instance, the location module 110 may deactivate a satellite antenna and/or a cellular antenna.

From block 314 or block 316, the method 300 may proceed to diamond 318. In diamond 318, the location module 110 may determine whether the user device 102 is moving at a speed equal to a typical walking speed. For instance, the location module 110 may determine, via location information and/or sensor information, whether the speed of the user device 102 is between a speed threshold range associated with walking speed. If the user device 102 is not moving at walking speed, the method 300 may proceed to block 320. In block 320, the location module 110 may adjust a respective scan rate of one or more of the antennas 114 to a lower scan rate. For instance, the location module 110 may determine that the user device 102 is stationary, or that the location 110 of the user device 102 is not changing. As a result, the location module 110 may decrease the respective scan rate of one or more of the antennas 114. As another example, the location module 110 may determine that user device 102 is moving faster than walking speed, or that the location of the user device is rapidly changing. In response, the location module 110 may again reduce the respective scan rate of one or more of the antennas 114.

If the location module 110 determines that the user device 102 is moving at walking speed, the method 300 may proceed to diamond 322. In diamond 322, the location module 110 may determine, based on sensor information, whether the application that requested the location information is being executed in the foreground (e.g., whether the application is a foreground application). If so, the method may proceed to block 324. In block 324, the location module 110 may facilitate operation of the antennas 114 at respective scan rates equal to their respective maximum scan rates (e.g., full scan rates). In certain implementations, this may include increasing a respective scan rate of a particular antenna operating a scan rate below its maximum scan rate. If the application is not in the foreground (e.g., the application is a background application), the method 300 may proceed to block 326. In block 326, the module 110 may reduce the respective scan rate associated with one or more of the antennas 114.

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the present disclosure have been described in connection with what is presently considered to be the most practical and various embodiments, it is to be understood that the present disclosure is not to be limited to the disclosed embodiments, but is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLES

Example 1 is a device for wireless communication, comprising: a plurality of antennas; a radio transceiver; at least one sensor component; at least one processor; and at least one memory storing computer-executable instructions, that when executed by the at least one processor, causes that at least one processor to: determine that the device is in an active state; determine, via the plurality of antennas in response to a location request, location information associated with the device, wherein a first antenna of the plurality of antennas is to operate at a current scan rate equal to a first scan rate; receive, from the at least one sensor component, sensor information associated with the device; determine, based at least in part on the location information and the sensor information, a scan rate adjustment event; and adjust, based least in part on the scan rate adjustment event, the current scan rate of the first antenna to a second scan rate different from the first scan rate.

In Example 2, the subject matter of Example 1 can optionally include that the first antenna is at least one of a Wi-Fi antenna, a cellular antenna, a global positioning satellite (GPS) antenna, or a Bluetooth antenna.

In Example 3, the subject matter of Example 1 can optionally include that the computer-executable instructions to determine the scan rate adjustment event further causes the at least one processor to: determine, based at least in part on the sensor information, that a battery level associated with a battery of the device is less than a battery level threshold.

In Example 4, the subject matter of Example 1 can optionally include that the computer-executable instructions to determine the scan rate adjustment event further causes the at least one processor to: determine, based at least in part on sensor information, that a display associated with the device has been deactivated.

In Example 5, the subject matter of Example 1 can optionally include that the computer-executable instructions to determine the scan rate adjustment event further causes the at least one processor to: determine, based at least in part on the location information, that the device is located indoors, wherein the first antenna comprises at least one of a GPS antenna or a cellular antenna.

In Example 6, the subject matter of Example 1 can optionally include that the computer-executable instructions to determine the scan rate adjustment event further causes the at least one processor to: determine, based at least in part on the sensor information, that the device is located outdoors, wherein the first antenna comprises at least one of a WiFi antenna, or a Bluetooth antenna.

In Example 7, the subject matter of Example 1 can optionally include that the computer-executable instructions to determine the scan rate adjustment event further causes the at least one processor to: determine, based at least in part on the sensor information and the location information, that the device is stationary.

In example 8, the subject matter of Example 1 can optionally include that the computer-executable instructions to determine the scan rate adjustment event further causes the at least one processor to determine, based at least in part on the sensor information, that the device is moving.

In example 9, the subject matter of Example 1 can optionally include that the computer-executable instructions to determine the scan rate adjustment event further causes the at least one processor to: identify an application that transmitted the location request; and determine that the application is a background application.

Example 10 is a method for wireless communication, comprising: determining, by a device comprising one or more processors and a plurality of antennas, that the device is in an active state; determining, via the plurality of antennas in response to a location request, location information associated with the device, wherein a first antenna of the plurality of antennas is to operate at a current scan rate equal to a first scan rate; receiving, from at least one sensor component included in the device, sensor information associated with the device; determine, based at least in part on the location information and the sensor information, a scan rate adjustment event; and adjusting, based least in part on the scan rate adjustment event, the current scan rate of the first antenna to a second scan rate, wherein the second scan rate is different from the first scan rate.

In Example 11, the subject matter of Example 10 can optionally include that the first antenna is at least one of a Wi-Fi antenna, a cellular antenna, a global positioning satellite (GPS) antenna, or a Bluetooth antenna.

In Example 12, the subject matter of Example 10 can optionally include that determining the scan rate adjustment event further comprises: determining, based at least in part on the sensor information, that a battery level associated with a battery of the device is less than a battery level threshold.

In Example 13, the subject matter of Example 10 can optionally include that determining the scan rate adjustment event further comprises: determining, based at least in part on sensor information, that a display associated with the device has been deactivated.

In Example 14, the subject matter of Example 10 can optionally include that determining the scan rate adjustment event further comprises: determining, based at least in part on the location information, that the device is located indoors, wherein the first antenna comprises at least one of a GPS antenna or a cellular antenna.

In Example 15, the subject matter of Example 10 can optionally include that determining the scan rate adjustment event further comprises: determining, based at least in part on the sensor information, that the device is located outdoors, wherein the first antenna comprises at least one of a WiFi antenna, or a Bluetooth antenna.

In Example 16, the subject matter of Example 10 can optionally include that determining the scan rate adjustment event further comprises: determining, based at least in part on the sensor information and the location information, that the device is stationary.

In Example 17, the subject matter of Example 10 can optionally include that determining the scan rate adjustment event further comprises: determining, based at least in part on the sensor information, that the device is moving In Example 18, the subject matter of Example 10 can optionally include that determining the scan rate adjustment event further comprises: identifying an application that transmitted the location request; and determining that the application is a background application.

Example 19, is a non-transitory computer-readable medium comprising instructions, that when executed by at least one processor, cause the at least one processor to: determine that a device is in an active state, the device comprising a plurality of antennas and at least one sensor component; determine, via the plurality of antennas in response to a location request, location information associated with the device, wherein a first antenna of the plurality of antennas is to operate at a current scan rate equal to a first scan rate; receive, from the at least one sensor component, sensor information associated with the device; determine, based at least in part on the location information and the sensor information, a scan rate adjustment event; and adjust, based least in part on the scan rate adjustment event, the current scan rate of the first antenna to a second scan rate, wherein the second scan rate is lower than the first scan rate.

In Example 20, the subject matter of Example 19 can optionally include that the first antenna is at least one of a Wi-Fi antenna, a cellular antenna, a global positioning satellite (GPS) antenna, or a Bluetooth antenna.

In Example 21, the subject matter of Example 19 can optionally include that the computer-executable instructions to determine the scan rate adjustment event further causes the at least one processor to: determine, based at least in part on the sensor information, that a battery level associated with a battery of the device is less than a battery level threshold.

In Example 22, the subject matter of Example 19 can optionally include that the computer-executable instructions to determine the scan rate adjustment event further causes the at least one processor to: determine, based at least in part on sensor information, that a display associated with the device has been deactivated.

In Example 23, the subject matter of Example 19 can optionally include that the computer-executable instructions to determine the scan rate adjustment event further causes the at least one processor to: determine, based at least in part on the location information, that the device is located indoors, wherein the first antenna comprises at least one of a GPS antenna or a cellular antenna.

In Example 24, the subject matter of Example 19 can optionally include that the computer-executable instructions to determine the scan rate adjustment event further causes the at least one processor to: determine, based at least in part on the sensor information, that the device is located outdoors, wherein the first antenna comprises at least one of a WiFi antenna, or a Bluetooth antenna.

In Example 25, the subject matter of Example 19 can optionally include that the computer-executable instructions to determine the scan rate adjustment event further causes the at least one processor to: determine, based at least in part on the sensor information and the location information, that the device is stationary.

In example 26, the subject matter of Example 19 can optionally include that the computer-executable instructions to determine the scan rate adjustment event further causes the at least one processor to determine, based at least in part on the sensor information, that the device is moving.

In example 27, the subject matter of Example 19 can optionally include that the computer-executable instructions to determine the scan rate adjustment event further causes the at least one processor to: identify an application that transmitted the location request; and determine that the application is a background application.

Example 26 is an apparatus for wireless communication. The apparatus may include a means for determining, by a device comprising one or more processors and a plurality of antennas, that the device is in an active state. The apparatus may include means for determine, via the plurality of antennas in response to a location request, location information associated with the device, wherein a first antenna of the plurality of antennas is to operate at a current scan rate equal to a first scan rate. The apparatus may include means for receiving, from at least one sensor component included in the device, sensor information associated with the device. The apparatus may include means for determine, based at least in part on the location information and the sensor information, a scan rate adjustment event. The apparatus may include means for adjusting, based least in part on the scan rate adjustment event, the current scan rate of the first antenna to a second scan rate, wherein the second scan rate is different from the first scan rate.

In Example 27, the subject matter of Example 26 can optionally include the first antenna and may be at least one of a Wi-Fi antenna, a cellular antenna, a global positioning satellite (GPS) antenna, or a Bluetooth antenna.

In Example 28, the subject matter of Example 26 can optionally include means for determining the scan rate adjustment event, and further include means for determining, based at least in part on the sensor information, that a battery level associated with a battery of the device is less than a battery level threshold.

In Example 29, the subject matter of Example 26 can optionally include means for determining the scan rate adjustment event and further include means for determining, based at least in part on sensor information, that a display associated with the device has been deactivated.

In Example 30, the subject matter of Example 26 can optionally include means for determining the scan rate adjustment event and further include means for determining, based at least in part on the location information, that the device is located indoors, wherein the first antenna comprises at least one of a GPS antenna or a cellular antenna.

In Example 31, the subject matter of Example 26 can optionally include means for determining the scan rate adjustment event and further include means for determining, based at least in part on the sensor information, that the device is located outdoors, wherein the first antenna comprises at least one of a WiFi antenna, or a Bluetooth antenna.

In Example 32, the subject matter of Example 26 can optionally include means for determining the scan rate adjustment event and further include means for determining, based at least in part on the sensor information and the location information, that the device is stationary.

In Example 33, the subject matter of Example 26 can optionally include means for determining the scan rate adjustment event and further include means for determining, based at least in part on the sensor information, that the device is moving.

In Example 34, the subject matter of Example 26 can optionally include means for determining the scan rate adjustment event and further include means for identifying an application that transmitted the location request; and means for determining that the application is a background application.

What is claimed is:

1. A device for wireless communication, comprising:
   a plurality of antennas;
   a radio transceiver;
   at least one sensor component;
   at least one processor; and
   at least one memory storing computer-executable instructions, that when executed by the at least one processor, causes that at least one processor to:
      determine that the device is in an active state, the active state comprising at least a power level of the device at a first power level, wherein the device is in a network comprising at least a second device;
      determine, via the plurality of antennas in response to a location request, location information for the device, wherein a first antenna of the plurality of antennas is to operate at a first scan rate;
      receive, from the at least one sensor component, sensor information for the device;
      detect, based at least in part on the location information and the sensor information, a scan rate adjustment event;
      adjust, based least in part on the scan rate adjustment event, the first scan rate of the first antenna to a second scan rate different from the first scan rate, the scan rate adjustment event corresponding at least a change of the first power level of the device; and
      scan, using the adjusted first scan rate, for a location of the second device in the network.

2. The device of claim 1, wherein the first antenna is at least one of a Wi-Fi antenna, a cellular antenna, a global positioning satellite (GPS) antenna, or a Bluetooth antenna.

3. The device of claim 1, wherein the computer-executable instructions to determine the scan rate adjustment event further causes the at least one processor to:
   determine, based at least in part on the sensor information, that a battery level associated with a battery of the device is less than a battery level threshold.

4. The device of claim 1, wherein the computer-executable instructions to determine the scan rate adjustment event further causes the at least one processor to:
   determine, based at least in part on sensor information, that a display associated with the device has been deactivated.

5. The device of claim 1, wherein the computer-executable instructions to determine the scan rate adjustment event further causes the at least one processor to:
   determine, based at least in part on the location information, that the device is located indoors, wherein the first antenna comprises at least one of a GPS antenna or a cellular antenna.

6. The device of claim 1, wherein the computer-executable instructions to determine the scan rate adjustment event further causes the at least one processor to:
   determine, based at least in part on the sensor information, that the device is located outdoors, wherein the first antenna comprises at least one of a WiFi antenna, or a Bluetooth antenna.

7. The device of claim 1, wherein the computer-executable instructions to determine the scan rate adjustment event further causes the at least one processor to:
   determine, based at least in part on the sensor information and the location information, that the device is stationary.

8. The device of claim 1, wherein the computer-executable instructions to determine the scan rate adjustment event further causes the at least one processor to:
   determine, based at least in part on the sensor information, that the device is moving.

9. The device of claim 1, wherein the computer-executable instructions to determine the scan rate adjustment event further causes the at least one processor to
   identify an application that transmitted the location request; and
   determine that the application is a background application.

10. The computer-readable medium of claim 1, wherein the computer-executable instructions to determine the scan rate adjustment event further causes the at least one processor to:
    identify an application that transmitted the location request; and
    determine that the application is a background application.

11. A method for wireless communication, comprising:
    determining, by a device comprising one or more processors and a plurality of antennas, that the device is in an active state, the active state comprising at least a power level of the device at a first power level, wherein the device is in a network comprising at least a second device;
    determining, via the plurality of antennas in response to a location request, location information for the device, wherein a first antenna of the plurality of antennas is to operate at a first scan rate;
    receiving, from at least one sensor component included in the device, sensor information for the device;
    determine, based at least in part on the location information and the sensor information, a scan rate adjustment event;
    adjusting, based least in part on the scan rate adjustment event, the first scan rate of the first antenna to a second scan rate different from the first scan rate, the scan rate adjustment event corresponding to at least a change of the first power level of the device; and scanning, using the adjusted first scan rate, for a location of the second device in the network.

12. The method of claim 11, wherein the first antenna is at least one of a Wi-Fi antenna, a cellular antenna, a global positioning satellite (GPS) antenna, or a Bluetooth antenna.

13. The method of claim 11, wherein determining the scan rate adjustment event further comprises:
    determining, based at least in part on the sensor information, that a battery level associated with a battery of the device is less than a battery level threshold.

14. The method of claim 11, wherein determining the scan rate adjustment event further comprises:
    determining, based at least in part on sensor information, that a display associated with the device has been deactivated.

15. The method of claim 11, wherein determining the scan rate adjustment event further comprises:
    determining, based at least in part on the location information, that the device is located indoors, wherein the first antenna comprises at least one of a GPS antenna or a cellular antenna.

16. The method of claim 11, wherein determining the scan rate adjustment event further comprises:
    determining, based at least in part on the sensor information, that the device is located outdoors, wherein the first antenna comprises at least one of a WiFi antenna, or a Bluetooth antenna.

17. The method of claim 11, wherein determining the scan rate adjustment event further comprises:
    determining, based at least in part on the sensor information and the location information, that the device is stationary.

18. The method of claim 11, wherein determining the scan rate adjustment event further comprises:
    determining, based at least in part on the sensor information, that the device is moving.

19. The method of claim 11, wherein determining the scan rate adjustment event further comprises:
    identifying an application that transmitted the location request; and
    determining that the application is a background application.

20. A non-transitory computer-readable medium comprising instructions, that when executed by at least one processor, cause the at least one processor to:
    determine that a device is in an active state, the device comprising a plurality of antennas and at least one sensor component, the active state comprising at least a power level of the device at a first power level, wherein the device is in a network comprising at least a second device;
    determine, via the plurality of antennas in response to a location request, location information for the device, wherein a first antenna of the plurality of antennas is to operate at a first scan rate;
    receive, from the at least one sensor component, sensor information for the device;
    determine, based at least in part on the location information and the sensor information, a scan rate adjustment event;
    adjust, based least in part on the scan rate adjustment event, the first scan rate of the first antenna to a second scan rate, the scan rate adjustment event corresponding to at least a change of the first power level of the device, wherein the second scan rate is lower the first scan rate; and
    scan, using the adjusted first scan rate, for a location of the device in the network.

21. The computer-readable medium of claim 20, wherein the first antenna is at least one of a Wi-Fi antenna, a cellular antenna, a global positioning satellite (GPS) antenna, or a Bluetooth antenna.

22. The computer-readable medium of claim 20, wherein the computer-executable instructions to determine the scan rate adjustment event further causes the at least one processor to:
    determine, based at least in part on the sensor information, that a battery level associated with a battery of the device is less than a battery level threshold.

23. The computer-readable medium of claim 20, wherein the computer-executable instructions to determine the scan rate adjustment event further causes the at least one processor to:
    determine, based at least in part on sensor information, that a display associated with the device has been deactivated.

24. The computer-readable medium of claim 20, wherein the computer-executable instructions to determine the scan rate adjustment event further causes the at least one processor to:
    determine, based at least in part on the location information, that the device is located indoors, wherein the first antenna comprises at least one of a GPS antenna or a cellular antenna.

25. The computer-readable medium of claim 20, wherein the computer-executable instructions to determine the scan rate adjustment event further causes the at least one processor to:
    determine, based at least in part on the sensor information, that the device is located outdoors, wherein the first antenna comprises at least one of a WiFi antenna, or a Bluetooth antenna.

* * * * *